US009710194B1

(12) United States Patent
Watson et al.

(10) Patent No.: US 9,710,194 B1
(45) Date of Patent: Jul. 18, 2017

(54) PORT PROVISIONING BASED ON INITIATOR USAGE

(71) Applicant: EMC Corporation, Hopkinton, MA (US)

(72) Inventors: Thomas Lee Watson, Richardson, TX (US); Anoop George Ninan, Milford, MA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 69 days.

(21) Appl. No.: 14/313,104

(22) Filed: Jun. 24, 2014

(51) Int. Cl.
G06F 12/00 (2006.01)
G06F 3/06 (2006.01)

(52) U.S. Cl.
CPC .......... G06F 3/0664 (2013.01); G06F 3/0617 (2013.01); G06F 3/0631 (2013.01); G06F 3/0689 (2013.01)

(58) Field of Classification Search
CPC ..... G06F 3/0664; G06F 3/0617; G06F 3/0689
See application file for complete search history.

(56) References Cited

U.S. PATENT DOCUMENTS

| 6,889,301 | B1* | 5/2005 | Wilson ................ G06F 11/2007 710/31 |
| 6,934,749 | B1 | 8/2005 | Black et al. |
| 8,588,991 | B1* | 11/2013 | Forbes, Jr. ............. G05B 19/02 700/286 |
| 9,521,085 | B1 | 12/2016 | Watson et al. |
| 2003/0187847 | A1* | 10/2003 | Lubbers .............. G06F 11/2082 |
| 2006/0047907 | A1* | 3/2006 | Shiga ..................... G06F 3/0605 711/114 |
| 2006/0080416 | A1 | 4/2006 | Gandhi |
| 2008/0127199 | A1* | 5/2008 | Miki ...................... G06F 3/0613 718/105 |
| 2009/0100188 | A1* | 4/2009 | Li ...................... H04N 21/23106 709/231 |
| 2009/0141705 | A1* | 6/2009 | Mosker ............. H04L 29/12301 370/352 |
| 2013/0110966 | A1* | 5/2013 | Nagami ................ H04L 47/125 709/214 |

OTHER PUBLICATIONS

Watson et al., "Policy-Based Bandwidth Allocation;" corresponds to U.S. Appl. No. 14/313,094, filed Jun. 24, 2014; 38 Pages.
Response to Office Action dated Jun. 10, 2016 from the U.S. Appl. No. 14/313,094, filed Oct. 5, 2016; 7 Pages.
U.S. Non-Final Office Action dated Jun. 10, 2016 corresponding to U.S. Appl. No. 14/313,094; 10 Pages.
U.S. Notice of Allowance dated Oct. 26, 2016 corresponding to U.S. Appl. No. 14/313,094; 7 Pages.

* cited by examiner

Primary Examiner — Charles Rones
Assistant Examiner — Nanci Wong
(74) Attorney, Agent, or Firm — Daly, Crowley Mofford & Durkee, LLP

(57) ABSTRACT

In one aspect, a method includes filtering one or more available ports on a data storage system to determine candidate ports based on at least their hardware redundancy information. The data storage system includes one or more data storage volumes. The method also includes allocating one or more ports to the data storage volume from the candidate ports based on a usage metric to enable communication from a host, using the one or more allocated ports, to the data storage volume through the one or more storage components.

20 Claims, 9 Drawing Sheets

PORT PROVISIONING BASED ON INITIATOR USAGE

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements (e.g., disk drives). The one or more processors perform their respective operations using the storage system. Mass storage systems (MSS) typically include an array of a plurality of disks with on-board intelligence and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

In one aspect, a method includes filtering one or more available ports on a data storage system to determine candidate ports based on at least their hardware redundancy information. The data storage system includes one or more data storage volumes. The method also includes allocating one or more ports to the data storage volume from the candidate ports based on a usage metric to enable communication from a host, using the one or more allocated ports, to the data storage volume through the one or more storage components.

In another aspect, an apparatus includes electronic hardware circuitry configured to filter one or more available ports on a data storage system to determine candidate ports based on at least their hardware redundancy information. The data storage system includes one or more data storage volumes. The apparatus also includes electronic hardware circuitry configured to allocate one or more ports to the data storage volume from the candidate ports based on a usage metric to enable communication from a host, using the one or more allocated ports, to the data storage volume through the one or more storage components.

In a further aspect, an article includes a non-transitory computer-readable medium that stores computer-executable instructions. The instructions cause a machine to filter one or more available ports on a data storage system to determine candidate ports based on at least their hardware redundancy information. The data storage system includes one or more data storage volumes. The instructions also cause the machine to allocate one or more ports to the data storage volume from the candidate ports based on a usage metric to enable communication from a host, using the one or more allocated ports, to the data storage volume through the one or more storage components.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts.

Thus, features and advantages of the present disclosure will become more apparent from the following detailed description of exemplary embodiments thereof taken in conjunction with the accompanying drawings in which.

Like reference symbols in the various drawings indicate like elements.

DETAILED DESCRIPTION

Figure 1:
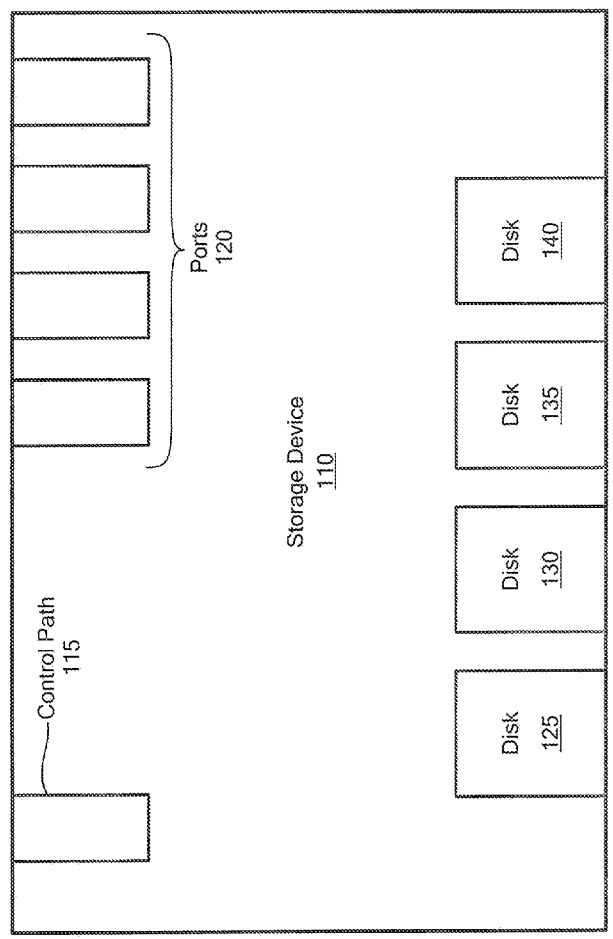
FIG. 1 is a simplified block diagram of an example of a data storage device.

Typically, provisioning of one or more data services in a data storage system may require a multitude of actions. Generally, provisioning of a data service may require an administrator and/or a user to manually allocate one or more ports to enable a host to communicate with a data storage volume in a data storage system. Traditionally, quickly provisioning ports in a balanced distribution across each component may not have been possible.

In certain embodiments, the current disclosure may enable a distributed software control platform that allows enterprise IT departments and cloud service providers to convert heterogeneous storage systems within a data center into one large storage array. In some embodiments, the current disclosure may enable exposure of logical storage resources and allow enterprise IT departments and cloud service providers to manage heterogeneous storage environments through a simple, robust Representational State Transfer (REST) API and a command-line interface (CLI). In at least one embodiment, one API and one CLI may be used to connect to all the storage arrays in a data center as if they were one large storage array.

In some embodiments, the current disclosure may enable a software platform for multi-tenant environments that delivers a single logical, cloud-scale, geo-distributed storage system for developers and storage/cloud administrators. In certain embodiments, the current disclosure may enable an enterprise to adopt hybrid management models in environments where storage infrastructure resides in enterprise data centers, but is also hosted by a service provider or a public cloud. In certain embodiments, the current disclosure may enable an enterprise to manage hybrid deployments as a single storage array. In further embodiments, the current disclosure may enable a data storage system to scale to millions of storage volumes and file shares. In still further embodiments, the techniques and implementations described herein may be deployed as a vApp, a set of virtual machines.

In certain embodiments, the current disclosure may enable data-centric cloud infrastructures to be managed efficiently and flexibly through a data management software platform. In some embodiments, the current disclosure may simplify the management of complex, heterogeneous, geo-distributed storage resources by exposing the storage systems as logical resources through robust, easy-to-use REST API and CLI interfaces. In most embodiments, the current disclosure may provide integrations into cloud stacks such as VMware® and OpenStack™.

In certain embodiments, the following definitions may be useful:

A data service may be a service for receiving, processing, storing, and protecting data. In certain embodiments, data services provide the high-level data and storage management capabilities of the system.

A control path may be a way to establish and control access to the data.

A data path may be the path the data takes from data storage provider to data storage consumer.

A storage medium may be any medium that is capable of storing data, including, but not limited to a storage array, a storage cluster, a physical disk, a virtual disk, and a virtual storage system.

A tenant may represent an organization operating within a data storage system. In some embodiments, a tenant may be generated in the system for the purposes of security isolation.

A neighborhood may represent a fault domain within a network. In many embodiments, a plurality of data centers may be combined to generate a federation. In some embodiments, the federation failures may occur that may affect the availability of resources. In certain embodiments, the data centers or federation may account for the failures by segmenting the infrastructure into different fault domains. In some embodiments, each fault domain may be designed to be isolated from other fault domains, while part of the same data center, so that each failure within one fault domain does not affect other fault domains.

A transport zone may represent a region of connectivity within a neighborhood. In many embodiments, a transport zone may include a network, such as a SAN network or an IP network. In various embodiments, a transport zone may include addresses (such as a World Wide Names (WWN) that may be in the network for both hosts and storage array ports. In some embodiments, addresses for hosts may include initiator addresses and/or IP addresses. In certain embodiments, a data storage system may be enabled to determine what initiators may be connected to what storage ports by analyzing a transport zone.

An initiator is a hardware interface that connects a host to a Storage Network for the purpose of accessing data stored in the Storage System. In many embodiments, an initiator may include a Fiber Channel (FC) initiator and/or an iSCSI initiator. In various embodiments, FC initiators may use a WWN address as a unique identifier in a data storage system. In various embodiments, a WWN may include a port address and/or node address. In certain embodiments, an iSCSI initiator may include addresses of type IQN and EUI.

An engine may be a hardware unit within a Symmetrix Array. In various embodiments, a VMAX system may include eight engines, where each engine may include two directors.

A director may be a hardware unit within a Symmetrix Array, on an engine. In some embodiment, each director may include one or more ports.

A project may be a resource organization abstraction that maps resources to applications, virtual data centers, departments, or other entities. In some embodiments, a user may generate their own projects, and may associate multiple resources from different data services with the projects. In most embodiments, resources from one project maybe shared between users under the same tenant.

A Class of Service may represent high-level capabilities and services that may be generated by administrators through composition of resource attributes and quality of services, including level of protection, availability, access protocol, performance, and additional storage/data services, such as versioning/snap, backup, remote replication, data reduction, encryption, and/or other data storage services. In many embodiments, users or tenants may select from a menu of Class of Service entries when generating a volume.

Generally, a data storage array or system may be one or more physical boxes or a cluster of physical boxes. In conventional systems, the data storage array or system may have one control path and one or more data paths. In typical systems, one or more data paths ports may provide data path access to the storage resources contained within the storage system. Typically, the protocols for the data path ports may be fiber channel, Internet Protocol (IP), iSCSI, NFS, or CIFS. Usually, to add more capacity to a data storage array or system, more physical disks, more inline cards, or more CPUs may be added to the data storage array or system. Conventionally, the data storage system or array may be a cluster of storage mediums. Typically, providing management for large numbers of data storage arrays or systems may be challenging.

Referring to FIG. 1 a storage device 110 includes a control path 115, ports 120, and disks 125, 130, 135 and 140. Control path 115 enables a user to interface with storage device 110. Control path 115 enables a user to access disks 125, 130, and 135, via the services storage device 110 offers, through one or more of ports 120.

In many embodiments, the current disclosure may enable allocation of storage ports for exporting volumes from storage arrays in a data storage system. In various embodiments, the current disclosure may eliminate the need for an administrator to manually allocate each storage port. In some embodiments, the current disclosure may maximize hardware redundancy between selected allocated paths by applying prioritized filtering of the candidate ports based on their hardware redundancy information. In certain embodiments, an arbitrary number of filters may be applied according to importance. For example, in an embodiment, a higher importance filter may be applied before a lower importance filter. In many embodiments, the current disclosure may enable automatic allocation of storage ports in one or more configurations. In various embodiments, the current disclosure may enable balanced usage and/or allocation of ports from a data storage array. In some embodiments, the current disclosure may determine a usage metric that is used to give allocation preference to ports that are less utilized than other ports.

In many embodiments, the current disclosure may enable optimized port selection for maximum redundancy which may consider both the data storage system, which may include the data storage array and the SAN fabric. In various embodiments, the current disclosure may enable load balancing across one or more data storage ports within a data storage system. In certain embodiments, the current disclosure may enable a user or administrator to dedicate one or more data storage ports for specific uses, such as a specified export group or project.

In many embodiments, the current disclosure may enable a port provisioning system to be implemented within a data storage system to enable allocation of storage ports for exporting volumes from storage arrays in a data storage system. In various embodiments, the port provisioning system may automatically adapt to a given configuration (i.e., a configuration which may include one or more SAN switches, one or more directors, one or more engines, one or more initiators, and/or one or more ports). In certain embodiments, the port provisioning system may automatically adapt to one or more network topologies. In some embodiments, a port provisioning system may be enabled to work with odd numbering of hardware, such as three directors, and may enable cycling through each director before reuse. In certain embodiments, the port provisioning system may allocate up to all ports that are available, across all switches, directors, and engines. In other embodiments, the port provisioning system may work well with symmetric configurations, such as two engines, each containing two directors, each connected to two SAN Switches.

In many embodiments, an automated provisioning system for storage arrays may be needed to pick and/or allocate storage ports on a storage array within a data storage system. In various embodiments, an automated provisioning system may be enabled to mask one or more ports to an export group, such that the ports may be used to access one or more desired storage volumes within the data storage system. In some embodiments, zones may be generated on a SAN switch which may allow a host to access storage array ports through the SAN fabric. In many embodiments, a storage port selection algorithm may take several considerations into account to optimize high availability, provide required bandwidth to the volume(s) by allocating a proportionate number of ports and to balance the load across the available storage ports.

In various embodiments, a data storage system may include one or more internal constructs and hardware to facilitate giving access to one or more volumes to one or more hosts. In certain embodiments, the one or more internal constructs and hardware may include switches, SAN switches, initiators, directors, engines, and/or storage ports. In many embodiments, a data storage system may include one or more data storage arrays which may be enabled to connect to one or more hosts. In some embodiments, one or more data volumes maybe allocated from one or more data storage arrays for one or more hosts. In other embodiments, a host may have one or more initiators having one or more ports enabled to connect a data storage volume. In many embodiments, a host initiator port may connect to a switch which may enable communication with a data storage volume on a data storage array in a data storage system. In various embodiments, each data storage array may enable access to a data storage volume through one or more ports. In some embodiments, a data storage array may include one or more engines, wherein each engine may include one or more directors. In certain embodiments, each director may include one or more ports which may enable access to one or more data volumes on a data storage array within a data storage system. In other embodiments, a data storage system may use other constructs and hardware to facilitate communication with data volumes within a data storage system.

In many embodiments, a port provisioning system may utilize one or more inputs to determine which ports are selected within a data storage system and allocated to a host. In some embodiments, a port provisioning system may receive Tenant Data, Administrative Data, and/or System Calculated Data. In various embodiments, Tenant Data may include data pertaining to one or more hosts requesting data services from the data storage system. In some embodiments, Tenant Data may include the number of initiators on a host. In certain embodiments, Tenant Data may include the port and node name of each host initiator. In an embodiment, the node name may include a worldwide name (WWN) of a node. In some embodiments, Tenant Data may include an iSCSI IQN or EUI address of a host initiator. In many embodiments, Tenant Data may include a specified Class of Service. Max_paths represents the maximum number of paths that will be provisioned for a host. In some embodiments, a Class of Service may include and/or imply a max_path value in the data storage system. In various embodiments, the paths_per_initiator represents the number of paths from a host initiator to storage.

In many embodiments, administrative data may include storage port registration status. In various embodiments, storage port registration status may specify which storage ports may be used by the data storage system. In certain embodiments, administrative data may include whether automated zoning may be enabled. In some embodiments, a data storage system may include one or more neighborhoods. In other embodiments, the current disclosure may enable a data storage system to automatically generate connectivity when storage volumes are exported or exposed for consumption. In certain embodiments, automatic zoning of the SAN fabric, i.e. network connectivity of certain components, when storage volumes are exported within a neighborhood may be performed.

In many embodiments, a data storage system may calculate system data which may be used by the port provisioning system. In various embodiments, system data may include and identify relevant transport zones, neighborhoods, candidate storage ports, redundancy groups, host connected switches, storage connected switches, and/or initiator-target communication ability. In certain embodiments, each host initiator may identify a transport zone connected to a data storage system. In various embodiments, each transport zone may be equivalent to a fiber channel fabric, a VSAN, an IP network, or other network type. In some embodiments, a transport zone may identify a set of potential host initiators and storage ports that may be zoned together enabling communication between them.

In many embodiments, each volume within a data storage system may identify and/or reside within a neighborhood in the data storage system. In various embodiments, a neighborhood may define a data center boundary within a data storage system. In certain embodiments, each transport zone may be contained within a specific neighborhood in a data storage system.

In other embodiments, each transport zone that may be used may identify a candidate set of storage ports and initiators within each respective transport zone that may be used together. In certain embodiments, a data storage system may determine a candidate set of storage ports based on storage ports that a system administrator registered in a given transport zone. In various embodiments, one or more data storage volumes may be connected to one or more hosts where the host initiators are in the same transport zone as the storage ports associated with the one or more data storage volumes. In various embodiments, a port provisioning system may use a candidate set of storage ports to export one or more data storage volumes to a host through a specified transport zone. In some embodiments, a host may be enabled to communicate with multiple transport zones, for example a host may have a first initiator in a first transport zone and a second initiator in a second transport zone. In various embodiments, a host may be enabled to communicate through two or more transport zones which may enable hardware redundancy when generating data paths from the host to the one or more data storage volumes.

In many embodiments, a data storage system may include one or more redundancy groups which may give the data storage system knowledge of hardware redundancy within the data storage system. In various embodiments, storage ports on a data storage system may be divided into one or more redundancy groups based on whether each port is implemented by separate hardware components. In some embodiments, storage ports in the same redundancy group may share components making these ports more likely to fail together. In other embodiments, redundancy groups may group ports by Engine, Director, slot number used, storage port name, and/or other storage port identifiers. In various embodiments, one or more redundancy groups may be used by the port provisioning system to enable allocation of ports in a manner to ensure that a one or more failures within a data storage system may not affect an overall stability and/or overall functionality of the data storage system. In other embodiments, one or more redundancy groups may be used by the port provisioning system to enable allocation of ports in a manner to ensure that a one or more failures within a data storage system may not affect the ability of a host to access a data storage volume from the data storage system.

In many embodiments, system data may include information on switch and communication availability between each host and data volumes allocated for each host. In some embodiments, system data may include each switch a host may be connected to. In certain embodiments, each host initiator may identify a SAN switch that is directly connected to the host. In other embodiments, system data may include each switch a storage port on a storage array may be connected to. In various embodiments, each candidate storage port may identify a switch that is directly connected to a storage port on a storage array. In many embodiments, system data may include information pertaining to initiator-target communication ability. In various embodiments, the existence of an initiator name and a target name in the same network or a network's database entries may indicate that the initiator and target may be able to communicate with each other.

In many embodiments, the current disclosure may enable a data storage system to allocate one or more ports for a single fiber channel and/or iSCSI transport zone using a port provisioning system. In various embodiments, if ports for multiple transport zones may be selected, a data storage system may use a port provisioning system to analyze each transport zone individually. In some embodiments, a port provisioning system may receive one or more inputs to make a determination of an efficient port allocation for a host utilizing data services in a data storage system. In certain embodiments, a port provisioning system may use tenant provided data, administrator provided data, and/or system calculated data.

In many embodiments, a port provisioning system may use tenant provided data, administrator provided data, and/or system calculated data to facilitate port allocation. In various embodiments, a port provisioning system may utilize one or more actions to determine an efficient allocation of ports for a data storage system. In some embodiments, a port provisioning system may enable a balanced allocation of storage ports throughout a data storage system. In various embodiments, a balanced allocation of storage ports may include a data storage system where each hardware component may allocate a similar number of storage ports across each hardware component. For example, in an embodiment, a data storage system allocating four ports through two engines would allocate two ports on each engine in the data storage system. In some embodiments, a balanced allocation of storage ports may mean an equal, or as close to equal, distribution of storage ports across each hardware component within the data storage system. In certain embodiments, a port provisioning system may be enabled to allocate storage ports based on one or more criteria. In many embodiments, a data storage system may include a data storage array including one or more data storage ports. In various embodiments, a data storage system may include a data storage array including one or more engines having one or more directors, having one or more data storage ports. In many embodiments, a port provisioning system may be enabled to generate a balanced allocation of data storage ports based on the configuration of the data storage system. In various embodiments, a port provisioning system may be enabled to generate a balanced allocation of data storage ports based on one or more levels of hardware components having data storage ports.

In many embodiments, a port provisioning service may determine available storage ports within a data storage system. In certain embodiments, a port provisioning system may verify that each available storage port is available through switches connected to a data storage system. In other embodiments, if a storage port is not available through a switch connected to a data storage system, a port provisioning system may remove the port from the list of available storage ports within the data storage system.

In some embodiments, a port provisioning system may be configured to balance ports across each hardware component type within a data storage system. In some embodiments, hardware may include one or more switches, one or more engines, one or more directors, or one or more ports. In certain embodiments, as a port provisioning system allocates ports, the port provisioning system may eliminate each piece of hardware used until all available hardware has been used.

In many embodiments, a port provisioning system may utilize one or more algorithms to analyze a data storage system and filter available data storage ports to determine a balanced and/or equal usage of ports across a given data storage system. In various embodiments, a port provisioning system may query a data system to determine which switches are available and which ports are connected to each available switch. In some embodiments, if a port is not currently connected to a switch, the port may be eliminated from the list of available ports. In certain embodiments, a port provisioning system may keep track of allocated ports, allocated engines, allocated directors, and/or allocated switches used while allocating ports to enable port provisioning system to allocate ports to maximize redundancy by utilizing each engine, director, and/or switch rather than allocating each port on a single entity.

In some embodiments, a port provisioning system may be enabled to allocate one or more available ports by filtering the available ports to enable a determination of a balanced and/or equal distribution of ports across each engine, director, and/or switch. In various embodiments, one or more filters may be applied in a precedence order from most important to least important consideration. In certain embodiments, the number of filters used may be adjusted. In many embodiments, a port provisioning system may use one or more filters, where each filter may operate on a data storage system entity, such as a VMAX engine, VMAX director, VNX processor, SAN switch, and/or other data storage system component. In some embodiments, each filter may require inputs, including: a current list of candidate ports, the filtering entities that have already been allocated or used, and a map from the contextual object that contains entries of an entity based on a key to the set of storage ports hosted by or associated with the entity. In many embodiments, as a port provisioning system starts allocating ports, each of the filters may have no allocated entities. In some embodiments, as the port provisioning system allocates ports, the port provisioning system includes the entities, from where the port was allocated, into its respective filter. In certain embodiments, the port provisioning system may continue to allocate ports while continually filtering out available ports using the specified filters. In some embodiments, once all entities are contained within each specified filter and no ports are available, each filter may be purged and the process repeated until the requested number of ports may be allocated.

Figure 2:
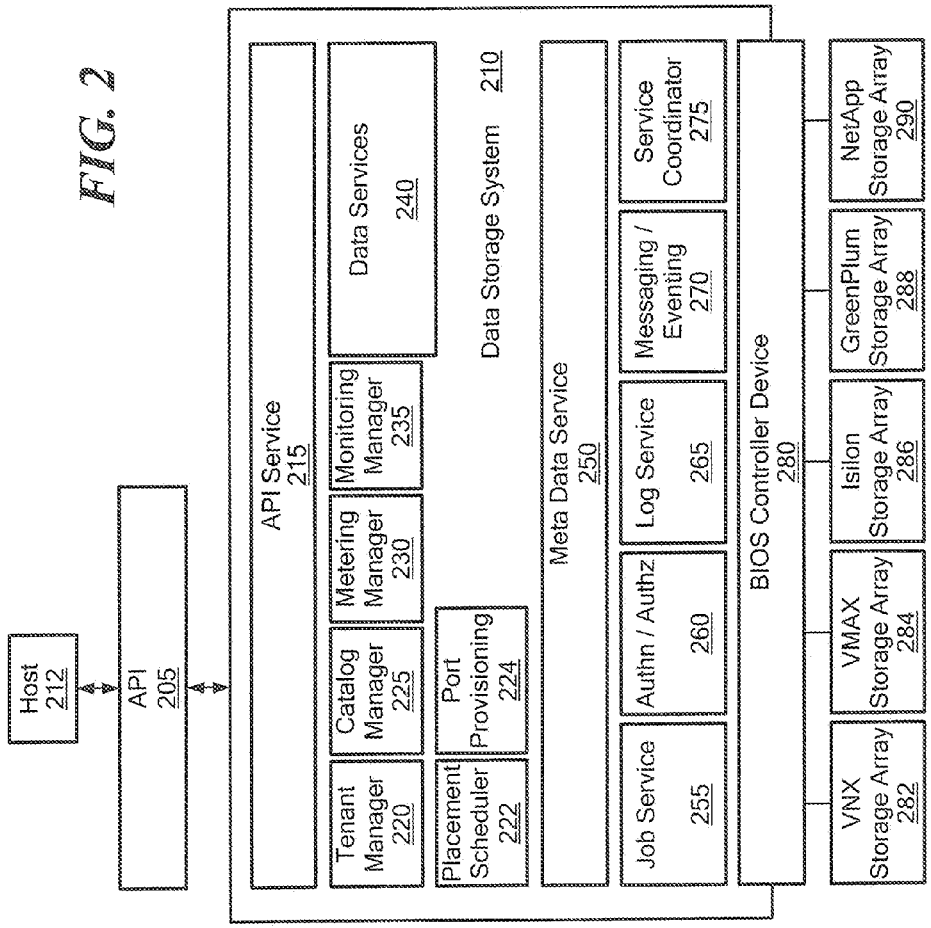
FIG. 2 is a simplified block diagram of another example of a data storage system.

Referring to FIG. 2, API Service 215 enables external access for Host 212 through API 205. API Service 215 communicates requests to data storage system 210. API Service 215 enables access to Service Coordinator 275, which enables access to other services and management modules. Through Service Coordinator 275, API Service 215 has access to tenant manager 220, catalog manager 225, metering manager 230, monitoring manager 235, data services 240, meta data service 250, job service 255, authn/ authz 260, log service 265, messaging/eventing 270, port provisioning 224, placement scheduler 222, and BIOS Controller Device 280. As shown, port provisioning 224 allocates data storage ports for data storage volumes allocated from attached data storage. In this embodiment, attached data storage includes VNX storage array 282, VMAX storage array 284, Isilon storage array 286, GreenPlum storage array 288, and NetApp storage array 290.

Figure 3:
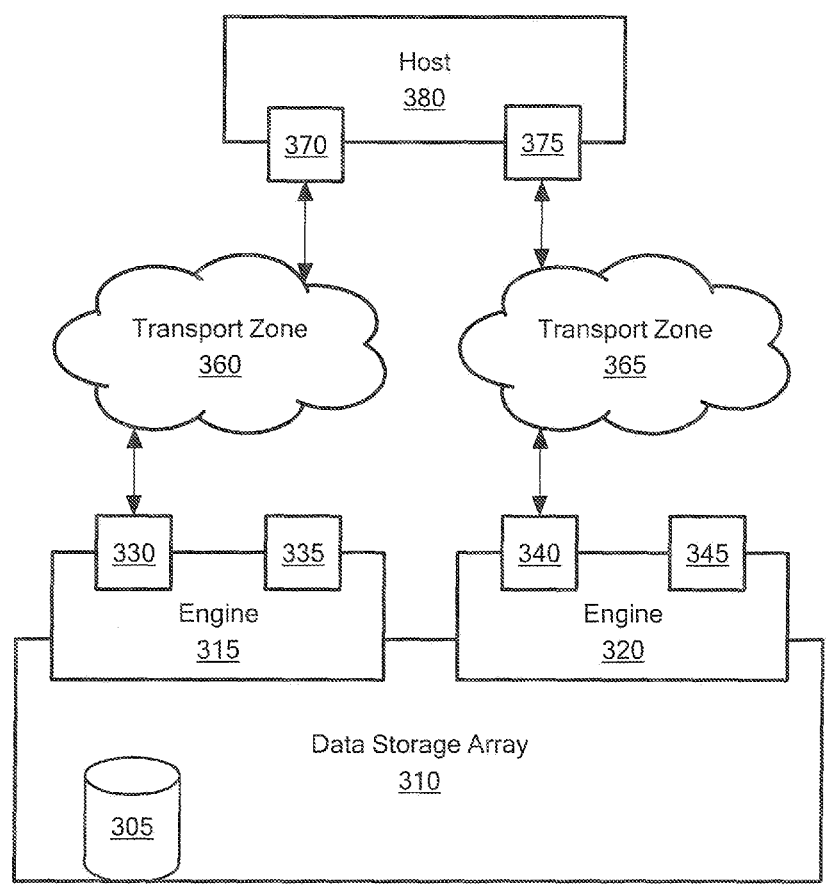
FIG. 3 is a simplified block diagram depicting an example of a host communicating with a data storage volume.

FIG. 3 depicts an example of how a host communicates with a data storage volume, in accordance with an embodiment of the present disclosure. As shown, data storage volume 305 has been allocated from a data storage pool from data storage array 310 to host 380. In this embodiment, Host 380 has initiator 370 and initiator 375, where each initiator includes a host port. Data storage Array 310 has engine 315 and engine 320. Engine 315 has director 330 and director 335. Engine 320 has director 340 and director 345. Each of the directors 330, 335, 340, 345 has four ports. As shown, host 380 is connected to data volume 305 through two data paths. A first data path is generated from initiator 370 to transport zone 360 to director 330. A second data path is generated from initiator 375 to transport zone 365 to director 340. In this embodiment, the first data path and second data path provides redundancy for host 380. Host 380 is enabled to access data volume 305 using the first data path or the second data path.

Figure 4:
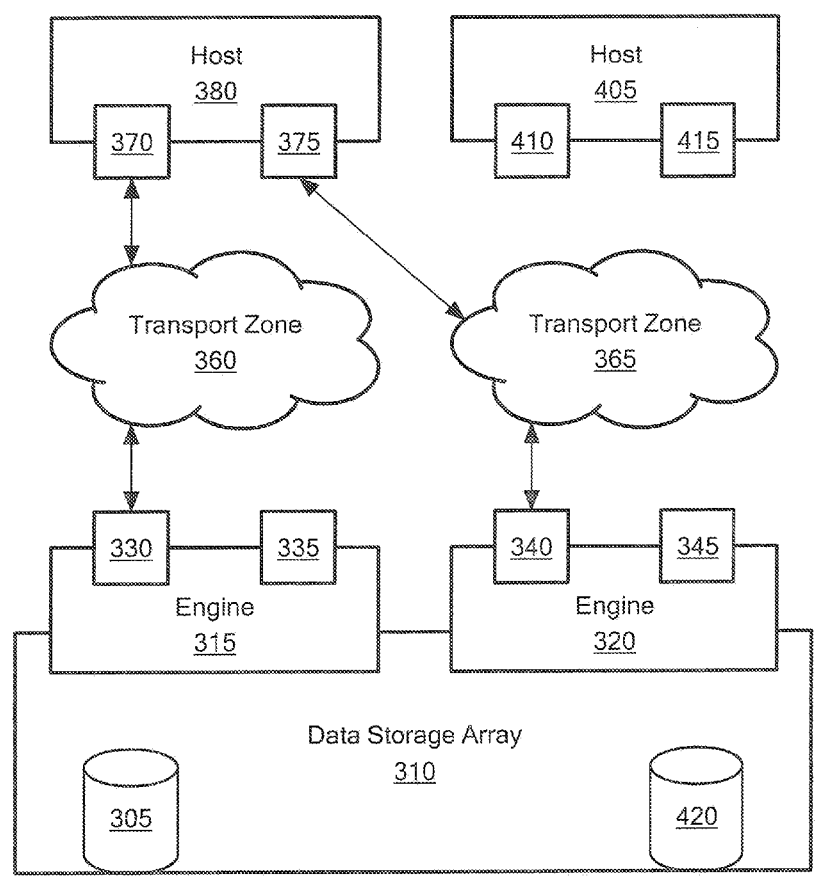
FIG. 4 is a simplified block diagram depicting an example of two hosts attempting to communicate with two data storage volumes.

FIG. 4 depicts an example of two hosts attempting to communicate with two data storage volumes, in accordance with an embodiment of the present disclosure. As shown, data storage volume 305 is allocated from data storage array 310 for host 380. In this embodiment, port provisioning system 224 (FIG. 2) has allocated ports for Host 380 enabling two data paths by which host 380 is enabled to communicate with data storage volume 305. In this embodiment, data storage volume 420 is allocated from data storage array 310 for host 405. In FIG. 4, similar to host 380, host 405 includes initiator 410 and initiator 415. As shown, port provisioning system 224 (FIG. 2) has not yet allocated a port to enable Host 405 to access data storage volume 420.

Figure 5:
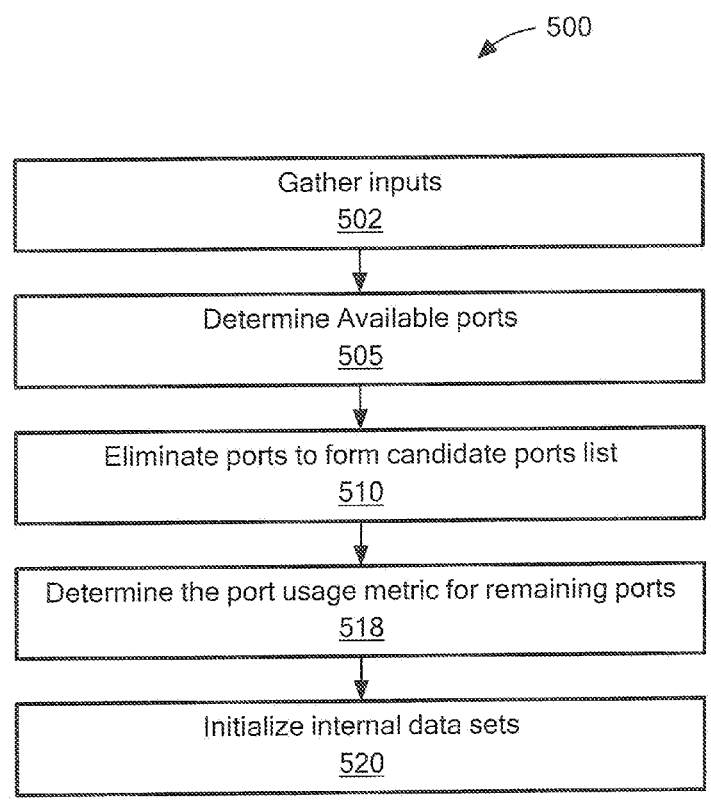
FIG. 5 is a simplified flowchart of an example of a process to initialize a port provisioning system.

Referring to FIGS. 2 and 5, an example of a process to initialize a port provisioning system is a process 500. Port provisioning system 224 gathers inputs (502), for example, from data storage system 210 regarding the configuration of the data storage system 210. Other inputs that may be gathered may include configuration of host 212. Further inputs that may be gathered include the connectivity of the host 212 to the transport zones determined from the network switches.

Port provisioning system 224 determines availability of ports within data storage system 210 (505). In many embodiments, determining availability of ports may include determining the number of storage ports to be allocated per transport zone, which may be calculated based on the number of Initiators, the distribution of Initiators to Transport Zones, and the max_path and paths_per_initiator parameters.

In one example, the port provisioning system 224 builds initialization structures from the gathered inputs. In many embodiments, an initialization structure may include one or more pointers to one or more transport zones. In various embodiments, an initialization structure may include a map of the available storage ports, where the keys are the port WWPNs or iSCSI address and the value may be the database representation of the storage port's physical structures and characteristics. In some embodiments, an initialization structure includes a map of the storage port ids to the storage port structures. In certain embodiments, an initialization structure may include a map of engine identifiers to a set of storage port structures that may be contained in that engine. In other embodiments, an initialization structure may include a map of the director or port group names to a set of storage port structures representing ports contained in each respective director. In many embodiments, an initialization structure may include a map of SAN switch names to a set of Storage Port structures that may be directly connected to the indicated switch. In various embodiments, an initialization structure may include a reverse map from storage port structure to the SAN switch name it may be directly connected to. In certain embodiments, an initialization structure may contain a set of already allocated engines that may indicate which engines were used in the allocation of ports from previous transport zones. In some embodiments, an initialization structure may include a set of already allocated directors that may indicate which directors were used in previous transport zones. In certain embodiments, an initialization structure may include a set of already used SAN switches.

The port provisioning system 224 may eliminate some of the available ports to form a list of the candidate ports (510). For example, unconnected ports or ports with a bad status indicator are eliminated from the available ports to form candidate ports. In one particular example, port provisioning system 224 uses the initialization structure in determining whether each data storage array port (FIG. 3) is usable (e.g., a port may be usable if a port provisioning system has access to discovered data about the transport zone connectivity of the port, and the port is active, not malfunctioning, and is connected to a SAN switch). In various embodiments, a port may not be usable if the port is not active, is malfunctioning, and/or disconnected from the switch or computer system. If a port is unusable, port provisioning system 224 eliminates the port from consideration in the allocation algorithm.

From the candidate ports, a mapping is generated to determine a usage factor (518). The usage factor for a port may be determined by a number of initiators mapped or zoned to that port. In one example, the usage factor is an integer value indicating the number of initiators using a port. In another example, the usage factor may be determined by the number of storage volumes or LUNs that are accessed through that port. (Each port may be used to access multiple volumes). In this example, the usage factor is an integer value indicating the number of volumes using each port.

In this embodiment, port provisioning system 224 initializes internal data sets (520). In many embodiments, a port provisioning system may maintain internal data structures for allocated ports, allocated engines, allocated directors, and allocated switches, which may represent ports which have been already allocated, the engines which have already been allocated, the directors which have already been allocated, and the switches which have already been allocated. Initially, each data structure is initialized to empty. In this embodiment, port provisioning system 224 sets candidate ports which include available storage ports in a transport zone minus any already allocated storage ports or any ports eliminated at processing block 510.

Figure 6:
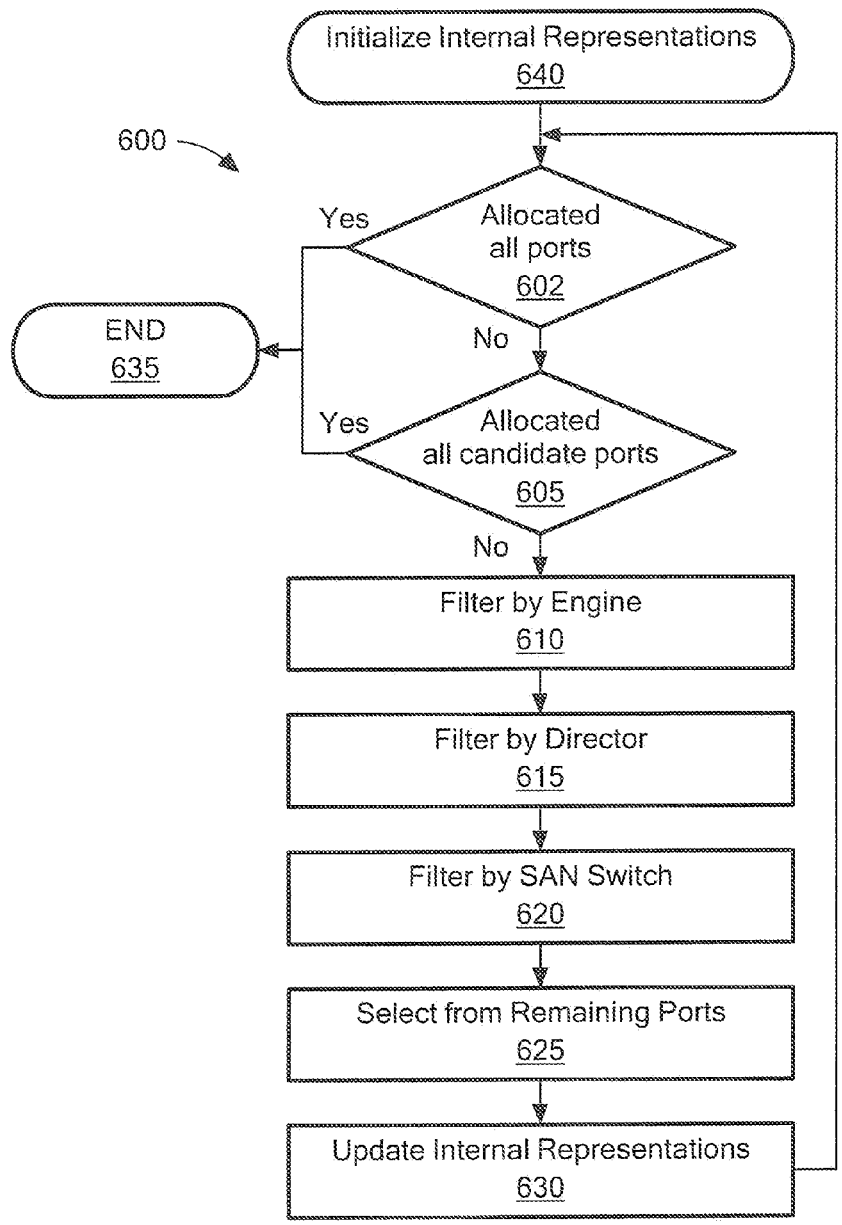
FIG. 6 is a simplified flowchart of an example of a process to provision ports in a data storage system.
Figure 7:
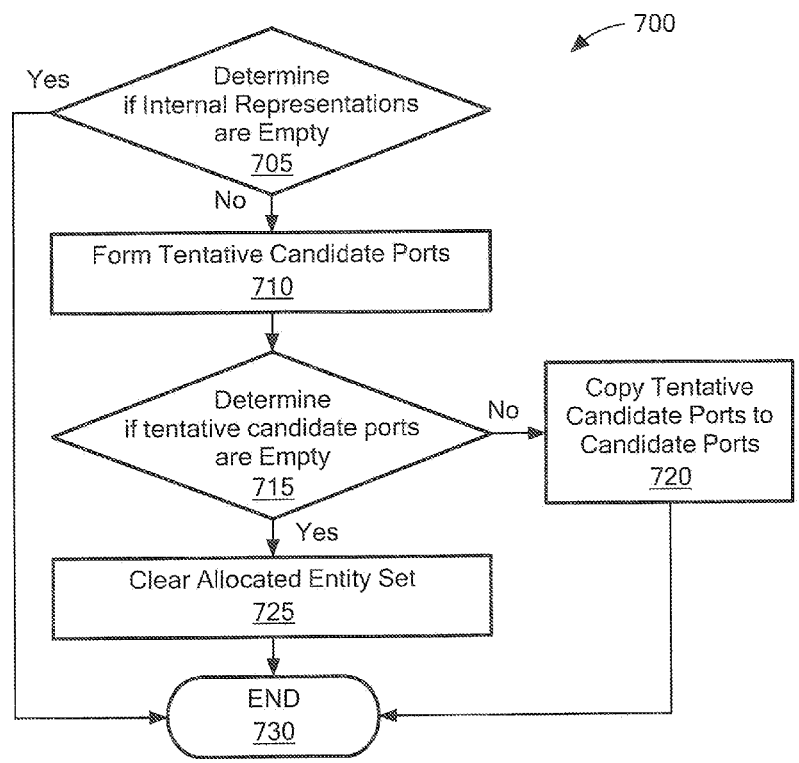
FIG. 7 is a simplified flowchart of an example of a process to filter ports in a port provisioning system.

Referring to FIGS. 2 and 6, an example of a process to provision ports in a data storage system is a process 600. Port provisioning system 224 initializes by initializing internal representations (640) of data storage system 210 and host 212. Port provisioning system analyzes internal representations and determines if each requested data path and/or storage ports are allocated (602). If each requested data path and/or storage port are allocated, port provisioning system 224 ends (635). If each requested data path and/or storage ports are not allocated, port provisioning system 224 determines if each candidate port has been allocated (605). If each candidate port has been allocated, port provisioning system 224 ends (635). In this embodiment, if there are one or more candidate ports, port provisioning system 224 filters the candidate ports by entity (an example of a Filtering algorithm is shown in FIG. 7). As shown, port provisioning system 224 filters by engine (610), filters by director (615), and filters by SAN Switch (620). In this embodiment, each filter removes ports from the candidate list which reside on already used entities. In other embodiments, port provisioning system may be enabled to filter ports based on one or more different types of entities. In various embodiments, entities may include directors, engines, SAN Switches, and/or other hardware components with a computer system and/or a data storage system.

As shown in FIGS. 2 and 6, port provisioning system 224 selects a port from the remaining ports on the candidate port list (625) and updates internal representations (630) of data storage system 210 and host 212. For example, from the ports remaining in the candidate ports, one of the ports with the lowest usage factor is selected to become the newly allocated port. A list of allocated ports is updated to include the newly allocated port. The lists of allocated engines, allocated directors and allocated switches are updated to reflect the newly allocated port's director and SAN switch associations so that the filters will use this information when allocating the next port. An update is made to the information in the context structure for already allocated directors and already used SAN switches in case that information is needed in subsequent Transport Zone allocations. By choosing the port with the lowest usage factor, the use will be balanced across all the available ports as new allocations are made. Additionally, if new ports are installed in the storage system, these new ports will be preferred for allocation until their usage is equalized with the existing ports.

In many embodiments, updating internal representations may include flagging which ports and/or components have been used to enable the generation of each data path from one or more hosts to one or more data volumes. Port provisioning system 224 restarts at processing block 602 until an end (635) is reached.

Referring to FIGS. 2 and 7, an example of a process to filter ports in a port provisioning system is a process 700. In this example, port provisioning system 224 is filtering ports by entity. In this embodiment, port provisioning system 224 determines if internal representations are empty (705) for the particular entity being filtered. If internal representations are empty, port provisioning system 224 ends filtering (730). If internal representations are not empty, port provisioning system 224 forms a tentative list of candidate ports (710).

In many embodiments, a tentative list of candidate ports may be determined based on which type of entity is being filtered. In some embodiments, a port provisioning system may calculate a tentative set of ports from the candidate ports by removing ports that belong to any of the engines in the allocated engines set. In various embodiments, a port provisioning a port provisioning system may calculate a tentative set of ports from the candidate ports by removing ports that belong to any of the directors in the allocated directors set. In certain embodiments, a port provisioning system may calculate a tentative set of ports from the candidate ports by removing ports that are connected to any of the switches in the allocated switches set.

As shown, port provisioning system 224 determines if the tentative candidate ports list is empty (715). If the tentative candidate ports list is empty, port provisioning system 224 clears the current allocated entity set (725) and ends filtering (730). If the tentative candidate ports list is not empty, port provisioning system 224 copies the tentative candidate ports list to the candidate ports list (720) and ends (730). In this embodiment, port provisioning system 224 retains the results of the filtering.

Figure 8:
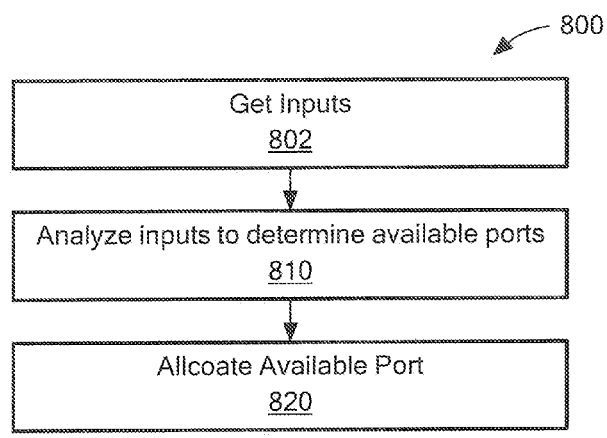
FIG. 8 is a simplified flowchart of an example of a process to provision ports to enable a host to communicate with a data storage volume using a port provisioning system.

Referring to FIGS. 2, 4 and 8, an example of a process to provision ports to enable a host to communicate with a data storage volume using a port provisioning system is a process 800. Port provisioning system 224 gets inputs (802) from data storage system 210 regarding configuration, host 405, and the availability of ports within data storage system 210. In this embodiment, host 405 requests two data paths to data storage volume 420. Port provisioning system 224 analyzes inputs to determine available ports (810). The provisioning ports process is executed for each transport zone through which provisioning system 224 generates a data path. In this embodiment, port provisioning system 224 determines that Host 405 has available ports on initiator 410 and on initiator 415. Port provisioning system 224 determines transport zone 360 and transport zone 365 has available ports. Port provisioning system 224 determines that data storage array 310 has available ports on engine 315 and engine 320. Port provisioning system 224 uses configuration input to filter available ports to determine a balanced allocation of ports. In this embodiment, Port provisioning system 224 allocates available ports to enable host 405 to communicate with data storage volume 420.

Figure 9:
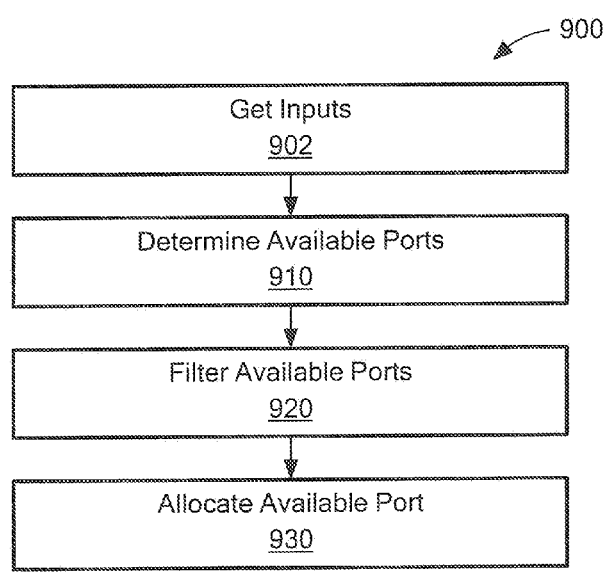
FIG. 9 is a simplified flowchart of another example of a process to provision ports to enable a host to communicate with a data storage volume using a port provisioning system.

Referring to FIGS. 2, 4 and 9, an example of a process to provision ports to enable a host to communicate with a data storage volume using a port provisioning system is a process 900. Port provisioning system 224 has been invoked in data storage system 210 where host 380 has two data paths to data volume 305. As shown, port provisioning system 224 gets inputs (902) from data storage system 210 regarding configuration, host 405, and the availability of ports within data storage system 210. In this embodiment, host 405 requests three data paths to data storage volume 420. Port provisioning system 224 determines which ports are available (910). In this embodiment, port provisioning system 224 filters the available ports (920) to determine a balanced allocation of ports. In this embodiment, port provisioning system 224 allocates available ports (930) to enable host 405 to communicate with data storage volume 420.

Figure 10:
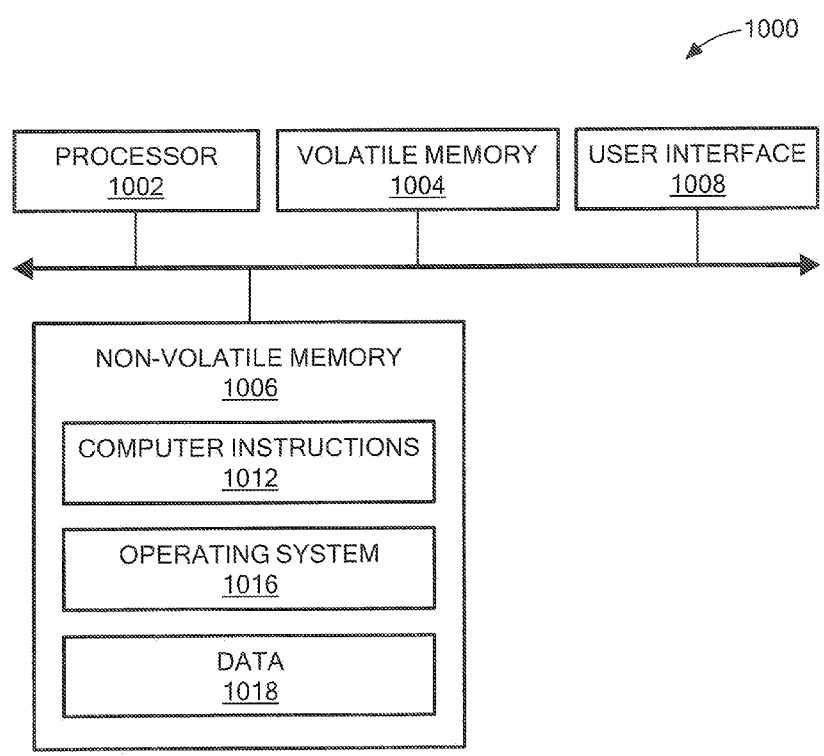
FIG. 10 is a simplified block diagram of an example of a computer on which any of the processes of FIGS. 5 to 9 may be implemented.

Referring to FIG. 10, a computer includes a processor 1002, a volatile memory 1004, a non-volatile memory 1006 (e.g., hard disk) and the user interface (UI) 1008 (e.g., a graphical user interface, a mouse, a keyboard, a display, touch screen and so forth). The non-volatile memory 1006 stores computer instructions 1012, an operating system 1016 and data 1018. In one example, the computer instructions 1012 are executed by the processor 1002 out of volatile memory 1004 to perform all or part of the processes described herein (e.g., processes 500, 600, 700, 800 and 900).

The processes described herein (e.g., processes 500, 600, 700, 800 and 900) are not limited to use with the hardware and software of FIG. 10; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 500, 600, 700, 800 and 900 are not limited to the specific processing order of FIGS. 5 to 9, respectively. Rather, any of the processing blocks of FIGS. 5 to 9 may be re-ordered, combined or removed, performed in parallel or in serial, as necessary, to achieve the results set forth above.

The processing blocks (for example, in the processes 500, 600, 700, 800 and 900) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A computer-implemented method for provisioning ports within a data storage system, the method comprising:
   generating a map of engine identifiers to a set of storage port structures associated with each engine and a map of director identifiers to a set of storage port structures associated to each director, based on the data storage system and connectivity of a host to a network coupled to the data storage system;
   filtering one or more available ports on the data storage system to determine candidate ports based on at least their hardware redundancy group information, the data storage system comprising a plurality of engines, a plurality of directors, and one or more data storage volumes, wherein the filtering includes:
   determining if the engines have a previously allocated port residing thereon based on the engine identifier map;
   removing ports from the candidate ports that reside on engines having one or more previously allocated ports unless the engines have a previously allocated port residing thereon,
   determining if the directors have a previously allocated port residing thereon based on the director identifier map;
   and removing ports from the candidate ports that reside on directors having one or more previously allocated ports unless the directors have a previously allocated port residing thereon; and
   allocating one or more ports to one of the data storage volumes from the candidate ports based on a usage metric to enable a balanced port allocation and communication from the host, using the one or more allocated ports, to the data storage volume through one or more storage components.

2. The method of claim 1, wherein allocating a port to the data storage volume from the candidate ports based on the usage metric comprises allocating a port to the data storage volume from the candidate ports based on a usage metric indicating a number of initiators accessing volumes through the port.

3. The method of claim 2, wherein allocating a port to the data storage volume from the candidate ports based on the usage metric indicating the number of initiators accessing volumes through the port comprises allocating a port to the data storage volume from the candidate ports to a port that has a usage metric indicating the lowest amount of initiator usage.

4. The method of claim 1, wherein allocating a port to the data storage volume from the candidate ports based on a usage metric comprises allocating a port to the data storage volume from the candidate ports based on a usage metric indicating a number of volumes that can be accessed through the port.

5. The method of claim 4, wherein allocating a port to the data storage volume from the candidate ports based on a usage metric indicating a number of volumes that can be accessed through the port comprises allocating a port to the data storage volume from the candidate ports to a port that has a usage metric indicating the lowest number of volumes that can be accessed by the port.

6. The method of claim 1, wherein the one or more storage components includes a first component and a second component, wherein each allocated port of the one or more available ports is balanced across the first component and the second component.

7. An apparatus, comprising:
electronic hardware circuitry configured to:
generate a map of engine identifiers to a set of storage port structures associated with each engine and a map of director identifiers to a set of storage port structures associated to each director, based on the data storage system and connectivity of a host to a network coupled to the data storage system;
filter one or more available ports on the data storage system to determine candidate ports based on at least their hardware redundancy croup information, the data storage system comprising a plurality of engines, a plurality of directors, and one or more data storage volumes, wherein the filtering removes ports from the candidate list that reside on engines having one or more previously allocated ports if any one of the engines does not have a previously allocated port residing thereon based on the engine identifier map, wherein the filtering further removes ports from the candidate ports that reside on directors having one or more previously allocated ports if any one of the directors does not have a previously allocated port residing thereon based on the director identifier map; and
allocate one or more ports to one of the data storage volumes from the candidate ports based on a usage metric to enable a balanced port allocation and communication from the host, using the one or more allocated ports, to the data storage volume through one or more storage components.

8. The apparatus of claim 7, wherein the circuitry comprises at least one of a processor, a memory, a programmable logic device or a logic gate.

9. The apparatus of claim 7, wherein the circuitry configured to allocate a port to the data storage volume from the candidate ports based on the usage metric comprises circuitry configured to allocate a port to the data storage volume from the candidate ports based on a usage metric indicating a number of initiators accessing volumes through the port.

10. The apparatus of claim 9, wherein the circuitry configured to allocate a port to the data storage volume from the candidate ports based on the usage metric indicating the number of initiators accessing volumes through the port comprises circuitry configured to allocate a port to the data storage volume from the candidate ports to a port that has a usage metric indicating the lowest amount of initiator usage.

11. The apparatus of claim 7, wherein the circuitry configured to allocate a port to the data storage volume from the candidate ports based on a usage metric comprises circuitry configured to allocate a port to the data storage volume from the candidate ports based on a usage metric indicating a number of volumes that can be accessed through the port.

12. The apparatus of claim 11, wherein the circuitry configured to allocate a port to the data storage volume from the candidate ports based on a usage metric indicating a number of volumes that can be accessed through the port comprises circuitry configured to allocate a port to the data storage volume from the candidate ports to a port that has a usage metric indicating the lowest number of volumes that can be accessed by the port.

13. The apparatus of claim 7, wherein the one or more storage components includes a first component and a second component, wherein each allocated port of the one or more available ports is balanced across the first component and the second component.

14. An article comprising:
a non-transitory computer-readable medium that stores computer-executable instructions, the instructions causing a machine to:
generate a map of engine identifiers to a set of storage port structures associated with each engine and a map of director identifiers to a set of storage port structures associated to each director, based on the data storage system and connectivity of a host to a network coupled to the data storage system;
filter one or more available ports on the data storage system to determine candidate ports based on at least their hardware redundancy group information, the data storage system comprising a plurality of engines, a plurality of directors, and one or more data storage volumes, wherein the filtering removes ports from the candidate ports that reside on engines having one or more previously allocated ports if any one of the engines does not have a previously allocated port residing thereon based upon the engine identifier map, wherein the filtering further removes ports from the candidate list that reside on directors having one or more previously allocated ports if any one of the directors does not have a previously allocated port residing thereon based upon the director identifier map; and
allocate one or more ports to the one of the data storage volumes from the candidate ports based on a usage metric to enable a balanced port allocation and communication from the host, using the one or more allocated ports, to the data storage volume through one or more storage components.

15. The article of claim 14, wherein the instructions causing the machine to allocate a port to the data storage volume from the candidate ports based on the usage metric comprises instructions causing the machine to allocate a port to the data storage volume from the candidate ports based on a usage metric indicating a number of initiators accessing volumes through the port.

16. The article of claim 15, wherein the instructions causing the machine to allocate a port to the data storage volume from the candidate ports based on the usage metric indicating the number of initiators accessing volumes through the port comprises instructions causing the machine to allocate a port to the data storage volume from the candidate ports to a port that has a usage metric indicating the lowest amount of initiator usage.

17. The article of claim 14, wherein the instructions causing the machine to allocate a port to the data storage volume from the candidate ports based on a usage metric comprises instructions causing the machine to allocate a port to the data storage volume from the candidate ports based on a usage metric indicating a number of volumes that can be accessed through the port.

18. The article of claim 17, wherein the instructions causing the machine to allocate a port to the data storage volume from the candidate ports based on a usage metric indicating a number of volumes that can be accessed through the port comprises instructions causing the machine to allocate a port to the data storage volume from the candidate ports to a port that has a usage metric indicating the lowest number of volumes that can be accessed by the port.

19. The article of claim 14, wherein the one or more storage components includes a first component and a second component, wherein each allocated port of the one or more available ports is balanced across the first component and the second component.

20. The method of claim 1 wherein allocating a port to the data storage volume from the candidate ports based on the usage metric comprises selecting a port from the candidate ports having a lowest usage metric.

* * * * *